Patented Aug. 6, 1929.

1,723,844

UNITED STATES PATENT OFFICE.

WHEELER P. DAVEY, OF SCHENECTADY, NEW YORK, ASSIGNOR TO GENERAL ELECTRIC COMPANY, A CORPORATION OF NEW YORK.

COATING MATERIAL.

No Drawing.   Application filed August 16, 1926. Serial No. 129,646.

The present invention relates to aqueous emulsion, such, for example, as the emulsion of japan-forming ingredients in water which is described in my prior Patents, No. 1,294,627 patented February 18, 1919, and 1,472,716 patented October 30, 1923.

In prior Patent No. 1,294,627, I have described the emulsification of japan-forming materials by a dilute alkaline solution, and I have included dilute ammonia as one of the emulsifying agents suitable for this purpose. In the later Patent, No. 1,472,716, I have described an improved process of making water japan, involving the use of concentrated alkali (hydroxide or carbonate) and employing higher temperatures than the former process.

Under these conditions, saponification of some of the oil occurs by the alkali, and the soap thus formed acts as an emulsifying agent. It is not practical to use ammonia as an emulsifying agent at high temperatures, as special means must be provided to prevent undue loss of ammonia.

One of the methods of applying water japan described in my Patent 1,294,627; namely, the electrical migration of the emulsified material (the disperse phase) and its deposition upon an electrode, a process sometimes termed as cataphoresis; proved to be less advantageous in the case of the japan made by the method of Patent No. 1,472,716.

I have discovered that the quality of coatings electrically deposited from water japan can be improved, and that thicker coating can be electrodeposited by the presence of ammonia in small amounts in the japan.

In carrying out my invention, a water japan base is made by the methods set forth in my Patent No. 1,472,716, utilizing a metallic alkali for saponifying some of the oil in the japan, as set forth in this patent. for example, the japan base may contain the following ingredients; parts being given by weight:

300 parts gilsonite.
75 parts rosin.
150 parts boiled China wood oil.
150 parts boiled linseed oil.

To this mixture 7.5 parts of sodium carbonate are added, and the precedure of Patent 1,472,716 is carried out. After dilution of this bituminous japan base with hot water, as described in this patent, and cooling, about one to ten per cent of ammonia is added. An ammonia content of 3.4 per cent is preferred. Finally, water is added to produce the desired dilution. Thereafter, the coatings of japan are applied by cataphoresis in accordance with the well-known procedure.

What I claim as new, and desire to secure by Letters Patent of the United States is:

1. A water japan which is capable of being electro-deposited containing an emulsifying agent comprising a metallic alkali soap and in addition thereto a quantity of ammonia.

2. A water japan which is capable of being electro-deposited containing a soap of an alkali metal and about 3.4 per cent by weight of uncombined ammonia.

3. The method of rendering water japan emulsion containing a metallic alkali soap as an emulsifying agent capable of deposition by cataphoresis which consists in adding ammonia to said emulson.

4. The method of improving the electro-deposition of a bituminous water japan containing a metal alkali soap as the emulsifying agent which consists in adding about one to ten per cent of ammonia to said japan.

In witness whereof, I have hereunto set my hand this 13 day of August, 1926.

WHEELER P. DAVEY.